April 14, 1970
L. D. HASKINS
3,505,793
FLOW CONTROL WITH FILTER
Filed Dec. 26, 1967
FIG. 1
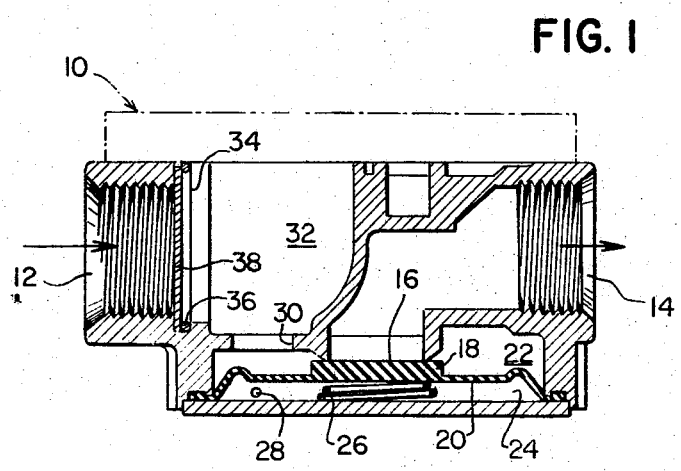
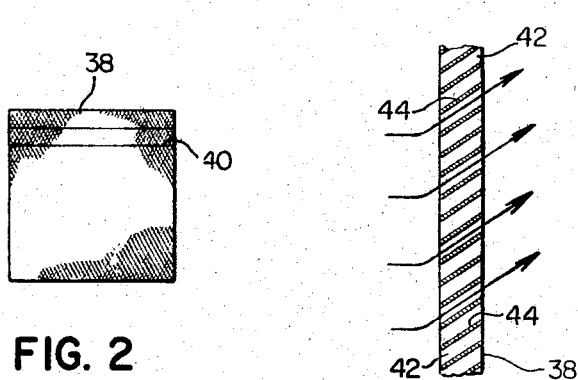
FIG. 2
FIG. 3
FIG. 4
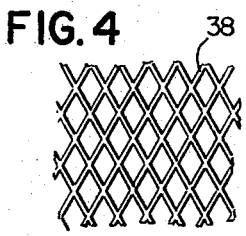
INVENTOR
LAUREN D. HASKINS
BY Christen, Sabol, O'Brien & Caldwell
ATTORNEYS

United States Patent Office 3,505,793
Patented Apr. 14, 1970

3,505,793
FLOW CONTROL WITH FILTER
Lauren D. Haskins, Long Beach, Calif., assignor to Robertshaw Controls Company, Richmond, Va., a corporation of Delaware
Filed Dec. 26, 1967, Ser. No. 693,549
Int. Cl. B01d 46/40
U.S. Cl. 55—417     5 Claims

ABSTRACT OF THE DISCLOSURE

A flow control device having a filter screen adjacent an inlet port; the screen includes a series of lowered strips which divert the fluid flow therethrough in a particular orientation with respect to the inlet port.

BACKGROUND OF THE INVENTION

The present invention relates to a flow control device and in particular, to a flow control having a filter which enhances the flow capacity of the device.

It is conventional practice to provide flow control devices with various types of filters in order to remove dirt, pipe filings, dust and other contaminants from the fluid flow. While it is desirable to filter the fluid flow, it is also necessary that the pressure drop across the control device be held to a predetermined minimum so that the rate of flow through the control device will be sufficient to meet the capacity requirements of the appliance being supplied. Thus, conventional flow control devices, which have filter elements therein, have been oversized in order to satisfy the capacity requirements.

SUMMARY OF THE INVENTION

It is, therefore, an object of the present invention to provide a flow control device with a filter element that enhances the rate of flow therethrough.

Another object of this invention is to provide a flow control device with a combined filtering and flow increasing element.

The present invention has a further object in that a filter element is selectively oriented in a flow control device to conform to a preselected rate of low therethrough.

In summarizing the present invention, a control device is embodied in a casing including inlet and outlet ports and an inlet cavity adjacent the inlet port, a perforate thin sheet of filter material disposed across the inlet port upstream of the inlet cavity to filter a flow thereinto, the thin sheet having a plurality of spaced thin-walled surfaces defining a plurality of openings, and the thin-walled surfaces being angularly disposed in a common direction with respect to the plane of the sheet whereby the entire fluid flow therethrough is diverted in the same common direction to facilitate the rate of flow between the inlet and outlet ports.

Other objects and advantages of the present invention will become apparent from the following description of a preferred embodiment taken in conjunction with the accompanying drawing.

BRIEF DESCRIPTION OF THE DRAWING

FIG. 1 is a vertical cross section of a control device casing embodying the present invention;

FIG. 2 is a front elevation of a detail of FIG. 1;

FIG. 3 is a partial cross section of FIG. 2 on an enlarged scale; and

FIG. 4 is a partial view of FIG. 2 on an enlarged scale.

DESCRIPTION OF THE PREFERRED EMBODIMENT

As is illustrated in FIG. 1, the present invention is embodied in a flow control device including a casing 10 having an inlet 12 and an outlet 14; the inlet 12 is connected to a suitable source, such as a gas main (not shown) while the outlet 14 is connected to a gas consuming device, such as a burner (not shown). Upstream of the outlet 14, the casing 10 has a valve seat 16 and a diaphragm type valve member 18 cooperates therewith to control the flow and regulate the pressure of the flow. The valve 18 is integrally formed on a flexible diaphragm 20 that is peripherally mounted between sections of the casing to define upper and lower chambers 22 and 24, respectively. A coil spring 26 in the lower chamber 24 is mounted in compression between the adjacent section wall of casing 10 and the undersurface of diaphragm 20 whereby the valve 18 is normally biased toward the valve seat 16.

The diaphragm 20 is operated by differential pressure between the two chambers 22 and 24. The lower chamber 24 defines an operating pressure chamber which communicates with a parallel bleed line (not shown) by means of a bleed port 28. The parallel bleed line extends from the inlet 12 to the outlet 14 and conventionally includes suitable controls for pressurizing or bleeding the chamber 24; the bleed line arrangement may take any suitable form such as is illustrated in U.S. Patent No. 3,235,180. The upper chamber 22 defines an inlet pressure chamber whereby the top surface of diaphragm 20 is subject to inlet pressure and when the undersurface of diaphragm 20 is subject to inlet pressure, the diaphragm valve 18 is closed by the coil spring 26.

A passageway 30 in the casing 10 establishes communication between the upper chamber 22 and an inlet cavity 32 which houses conventional safety and manual control devices so well known in the art that detailed descriptions are omitted for the sake of brevity. An inlet passage 34 between the inlet 12 and the inlet cavity 32 includes a slot in which a retainer ring 36 retains a screen 38. As is shown in FIG. 1, the slot is open at the top of the casing section so that assembly and/or removal of the screen 38 is easily accomplished by first removing the top section (shown in dashed lines) of the casing 10. As shown in FIG. 2, one face of the screen 38 is provided with an indicating strip 40 whereby the orientation of the screen 38 may be accomplished.

The filtering and turbulence reducing screen 38 is provided with a multiplicity of small openings, indicated by numeral 42 in the fragmentary sectional view of FIG. 3, each opening being defined by a series of diagonally extending thin strips 44. In one embodiment of the invention these strip like members are produced by a rolling and extending process applied to a strip of thin imperforate metal to form by conventional methods well known in the art, a mesh like material known as an expanded metal screen. The result of this formation of expanded metal is to produce a series of diamond shaped openings (see FIG. 4), the opposite sides of which comprise flat surfaces extending in parallel directions. Preferably these surfaces are oriented so that one pair of opposite surfaces intersect the other pair of opposite surfaces defining each of the openings along lines which are parallel to each other and extending in plane normal to the surface of the sheet of filter material itself and each of said planes being disposed, for convenience, parallel with one of the marginal edges of the filter screen. In the form of the invention shown in FIG. 4, the line of conversion of parallel opposite pairs of walls defining the diamond shaped openings can be considered as lying in planes normal to the surface of the sheet of drawings and disposed vertically. Each of these lines of conversion are disposed at an angle with respect to the surface of the sheet parallel to each other, and if the filter in FIG. 2 is considered as being viewed from the right in FIG. 1, the angle of inclination of the lines of conversion would be in an upward direction. Thus, as shown in FIG. 1, the gas entering the chambr 32 is diverted over its entire cross-sectional area in a generally upward direction. An experiment as shown that the best results are obtained when the filter 38 is arranged in this position.

For example, the following table indicates the relative rates of flow of gas through the regulating mechanism with the screen 38 positioned in the inlet opening in each of the four possible directions of orientation, namely: (1) with the direction of flow of gas being upward; (2) with the direction of flow being downward; (3) with the direction of flow being towards the rear side wall; and, (4) with the direction of flow being away from the rear side wall. In the table below column 1 indicates the direction of flow of the gas through the filtering and turbulence reducing screen 38; column 2 indicates the total amount of gas flow, measured in terms of c.f.h. (cubic feet per hour) by a water column pressure drop of .80 inch, and column 3 indicates the amount of gas measured in terms of c.f.h. by a water column pressure drop of 1.0 inch.

TABLE I

| Column 1 | Column 2 | Column 3 |
| --- | --- | --- |
| Up | 270 | 305 |
| Down | 256 | 290 |
| Toward | 265 | 295 |
| Away | 252 | 282 |

A second sample of a filter and turbulence reducing screen 38 was subjected to experiment and the results are shown below in Table II.

TABLE II

| Column 1 | Column 2 | Column 2 |
| --- | --- | --- |
| Up | 275 | 310 |
| Down | 255 | 285 |
| Toward | 260 | 290 |
| Away | 250 | 282 |

In the above experiments, the control device 10 was first measured without any filter screen and the fluid flow was measured at 255 c.f.h. (natural gas with .64 specific gravity) with a water column pressure drop of .80 inch, i.e., column 2, and at 290 c.f.h. in column 3. Then, with the screen 38 oriented for upward flow, the capacity was increased from 255 to 270 c.f.h. in column 2 and from 290 to 305 c.f.h. in column 3 of Table I; similar percentage increases are found also apparent from Table II.

The above test results clearly demonstrate that with the employment of the improved form of the louvered filter disposed across the inlet results in a measurable increase in the rate of flow through the control device. The combined filter and turbulence reducing element is believed to bring about these unexpected results because of the premise that the individual gas molecules are caused to flow in parallel lines across the entire cross-sectional flow area; furthermore, the individual gas molecules are precluded from diffusing or converging and thus do not interfere with the forward motion of each other. In other words, the gas molecules proceed in substantially a common direction rather than follow a haphazard or sercurious path.

In accordance with the present invention, the screen 38 provides a series of closely spaced lattice like filters, the individual members of which comprise a series of thin strip like elements disposed in parallel relation at a slight angle with respect to the direction of impingement (see FIG. 3) of the flow. Thus, the gas flow moving in a direction parallel with the axis of the inlet is diverted over its entire cross-sectional area in an oblique direction with respect to such axis.

Inasmuch as the present invention is subject to many modifications, variations and changes in detail, it is intended that all matter contained in the foregoing description or shown on the accompanying drawing, shall be interpreted as illustrative and not in a limiting sense.

What is claimed is:

1. In a flow control device, the combination comprising a casing having inlet and outlet ports and valve means for controlling a fluid flow therethrough, an inlet cavity being adjacent said inlet port and defining a flow chamber adapted for communication with said outlet port, an inlet passage having an axis defining a single flow path between said inlet port and said cavity, a perforated filter sheet extending completely across said inlet passage and being transversely disposed to the axis thereof, said filter sheet having a plurality of thin-walled surfaces defining a plurality of openings whereby the fluid flow is dispersed into a plurality of separated fluid flows, each of said plurality of thin-walled surfaces being disposed in oblique angular relation to the axis of said inlet passage, said oblique angular relation being the same for each of said thin-walled surfaces causing the separated fluid flows to be angularly diverted in a common direction through said filter sheet, and said oblique angular relation being so selected as to enhance the rate of flow therethrough.

2. The invention as recited in claim 1 wherein said thin-walled surfaces have portions defining flat strips disposed in generally parallel spaced planes.

3. The invention as recited in claim 1 wherein said thin-walled surfaces have portions defining flat strips in a louvered arrangement.

4. The invention as recited in claim 1 wherein said thin sheet comprises a sheet of expanded metal and said thin-walled surfaces are arranged in opposing pairs whereby said openings have a generally diamond-shape.

5. The invention as recited in claim 4 wherein said casing includes slot means for said thin sheet for removal and insertion thereof, and wherein said thin sheet includes indicia means whereby said thin sheet may be oriented relative to the axis of the inlet passage for selecting the common direction of the fluid flow through said openings.

References Cited

UNITED STATES PATENTS

| | | | |
| --- | --- | --- | --- |
| 1,821,190 | 9/1931 | Ray et al. | 210—447 X |
| 2,353,143 | 7/1944 | Bryant | 251—118 X |
| 2,552,744 | 5/1951 | Smith | 210—447 |
| 2,989,145 | 6/1961 | Goodloe | 55—443 |
| 3,208,204 | 9/1965 | Persson | 55—443 |
| 3,297,260 | 1/1967 | Barlow | 137—550 X |
| 3,342,024 | 9/1967 | Westlin | 55—443 |

SAMIH N. ZAHARNA, Primary Examiner

U.S. Cl. X.R.

137—550; 236—80